Sept. 20, 1966 H. BADER 3,273,391
DYNAMIC FLOW METER
Filed Nov. 29, 1963 4 Sheets-Sheet 1

INVENTOR
HORST BADER

BY Dicke + Craig
ATTORNEYS

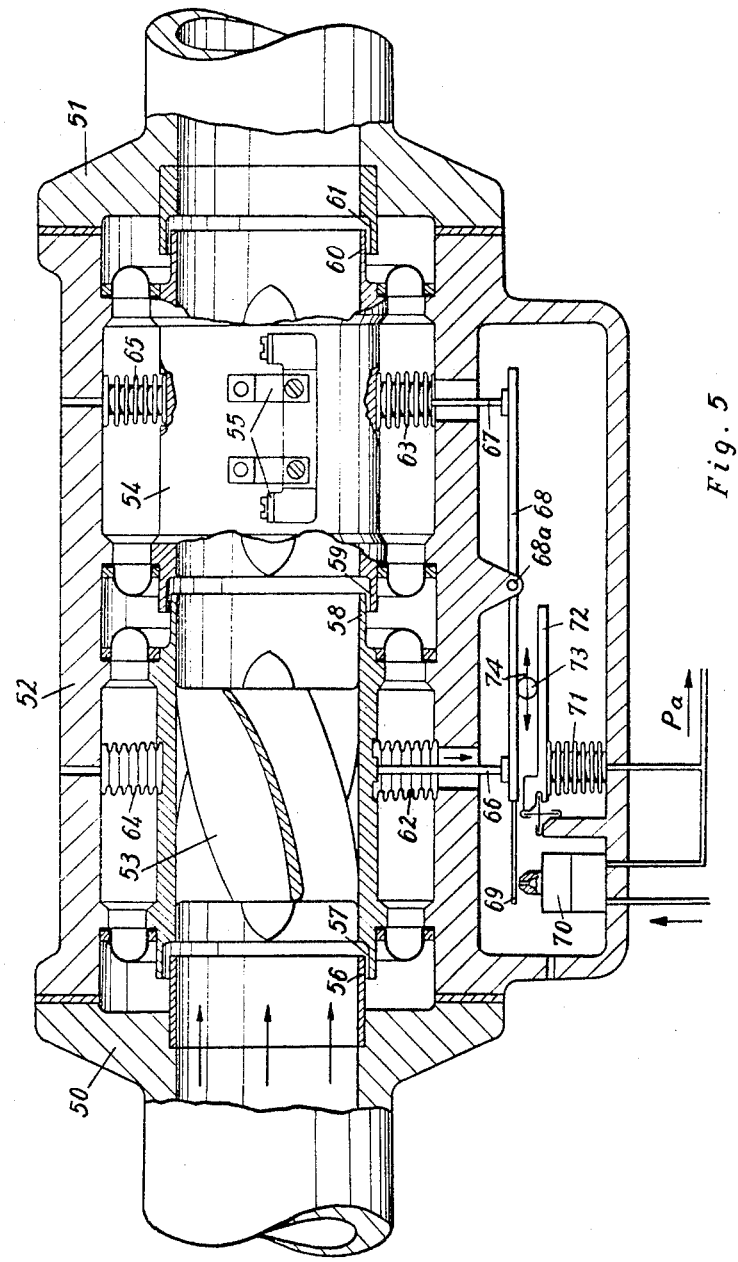

United States Patent Office 3,273,391
Patented Sept. 20, 1966

3,273,391
DYNAMIC FLOW METER
Horst Bader, Stuttgart-Sillenbuch, Germany, assignor to
J. C. Eckardt A.G., Stuttgart-Bad Cannstatt, Germany
Filed Nov. 29, 1963, Ser. No. 326,962
Claims priority, application Germany, Mar. 20, 1963,
E 24,522; Apr. 26, 1963, E 24,741
11 Claims. (Cl. 73—228)

The present invention relates to a method and an apparatus for measuring the rate of flow of a gaseous or liquid medium flowing through a pipe line.

Aside from flow meters which operate by electromagnetic, accoustic, and other measuring methods, especially the dynamic flow meters are known which measure the rate of flow, for example, according to the differential pressure principle, the dynamic pressure principle, or by measuring the revolution of vanes.

Thus, for example, according to the differential pressure principle, the pressure which prevails in front of and behind a diaphragm or nozzle is conducted to a differential pressure transformer which indicates the differential pressure within the pressure range of 0.2 to 1 atm. or compares and indicates the differential pressure by means of a spring element.

The last-mentioned flow meters have the disadvantage that very expensive supplementary devices are required and that blind areas occur in the flow of the media in front of and behind the diaphragms with the result that deposits of the media or of solid inpurities therein will occur in these areas which falsify the results of the measurements.

It is an object of the present invention to provide a new dynamic flow measuring method which permits the rate of flow of the medium to be measured in a very simple manner on the outer side of the pipe line. Further objects of the invention are to permit accurate measurements of the rate of flow of the medium to be attained regardless of any impurities in the medium, to avoid absolutely any blind areas within the pipe line which might lead to deposits of impurities, and to effect the measurements independently of the static pressure and also of the turbulence of the flowing medium.

For attaining these objects, the present invention provides a novel method of measuring according to which the twisting motion of the medium flowing through a pipe line is modified and controlled or the flowing medium is given a twisting motion, and the torque which is produced by this twist and reacts upon the pipe line is then measured. In order to avoid the effects of too large turning movements of the pipe line resulting from the reactive torque, the invention further provides that the torque which is exerted upon the pipe line may be measured by a compensating measuring method.

For carrying out the measuring method according to the invention, this invention further provides an apparatus which essentially consists of a pipe section which is movable about an axis extending parallel to the general direction of flow and carries means for modifying and controlling the twist of the flow of the medium or for producing a twisting motion thereof, and of a measuring instrument for measuring the reaction of the torque which is acting upon the movable pipe section.

These and further features and advantages of the present invention will become more clearly apparent from the following detailed description thereof which is to be read with reference to the accompanying drawings, in which—

FIGURE 4a shows a cross section which is taken along the line IVa—IVa of FIGURE 4; while FIGURE 5 shows a flow meter according to a further modification of the invention, in which two units similar to the unit as shown in FIGURE 4 are inserted in series into the pipe line.

Figure 1:
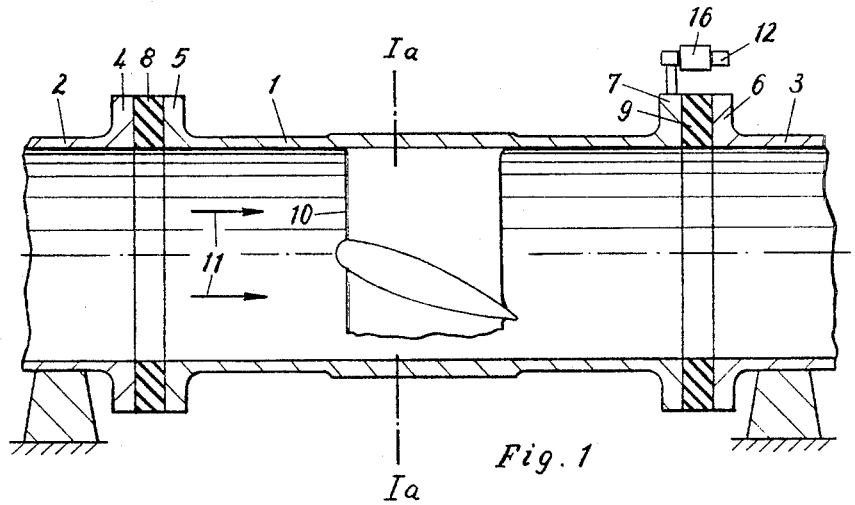
FIGURE 1 shows a longitudinal section of a flow meter according to the invention consisting of a pipe section containing a guide wheel which is resiliently connected to the adjacent parts of the pipe line, and of an electromagnetic measuring device.
Figure 1A:
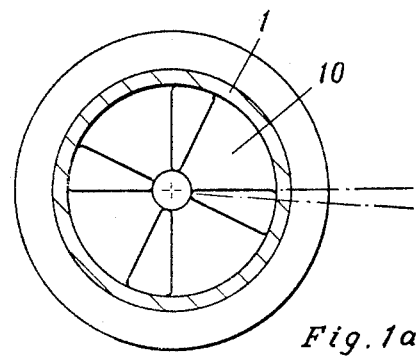
FIGURE 1a shows a cross section which is taken along the line Ia—Ia of FIGURE 1.
Figure 1B:
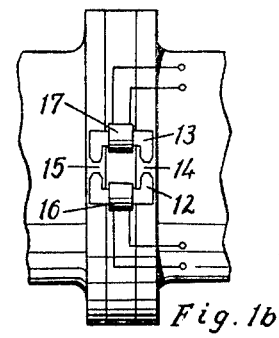
FIGURE 1b shows a plan view of the electromagnetic measuring device according to FIGURE 1.

As illustrated in FIGURE 1 of the drawings, the flow meter according to the first embodiment of the invention consists essentially of a movable pipe section 1 which is connected by flanges to the stationary connecting ends 2 and 3 of the main pipe line through which the medium is passed the rate of flow of which is to be measured. The adjacent flanges 4 and 5 at one end of pipe section 1 and the flanges 6 and 7 at the other end are connected to each other merely by rings 8 and 9 which are glued or vulcanized to the flanges. These rings 8 and 9 consist of a resilient material, for example, rubber or plastic, and permit a small torsion of pipe section 1 about its longitudinal axis relative to pipes 2 and 3. The movable pipe section 1 contains a guide wheel 10, as shown particularly in FIGURE 1a, which is rigidly mounted therein and through which the medium to be measured flows in the direction of the arrows 11. Pipe section 1 and guide wheel 10 may be made of metal or plastic and are preferably integral with each other, for example, by being cast as one piece.

Guide wheel 10 the blades of which may be vane or airfoil-shaped gives the medium flowing therethrough a twisting motion which produces a reactive torque upon the guide wheel which, due to the resilient suspension of the movable pipe section 1, causes this entire part 1 to twist relative to the connecting pipes 2 and 3. The rotary movement is then measured by means of an electromagnetic measuring device which essentially consists of two iron cores 12 and 13, one of which is rigidly mounted on the movable pipe section 1, while the other is rigidly mounted on the stationary connecting pipe 3. According to the most simple type of construction, the iron cores are U-shaped and their pole ends which face each other are separated by two air gaps 14 and 15 which extend parallel to the longitudinal axis of the flow meter. Each iron core carries a coil 16 or 17, one of which—the primary coil 16 is supplied with alternating current. The voltage which is induced in the secondary coil 17 depends upon the width of the air gaps 14 and 15 which, in turn, depends upon the torsion of the pipe section 1. After the flow meter has been properly calibrated, the voltage which may be measured on the secondary coil 17 will indicate the rate of flow of the medium through the pipe section 1 and the parts 2 and 3 of the main pipe line.

In place of an electromagnetic measuring device it is, of course, also possible to employ any other suitable measuring means, for example, pneumatic or piezo-electric measuring devices.

Figure 2:
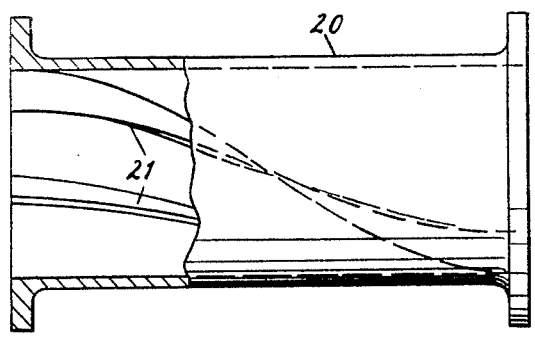
FIGURE 2 shows, partly in section, a modification of the pipe section with other means for producing a twisting motion of the flowing medium.

FIGURE 2 illustrates a movable pipe section 20 which may be employed in place of the pipe section 1 according to FIGURE 1. The twisting effect and its reaction is in this case produced by the helical screw-like projections 21 on the inner wall of the pipe section 20.

Figure 3:
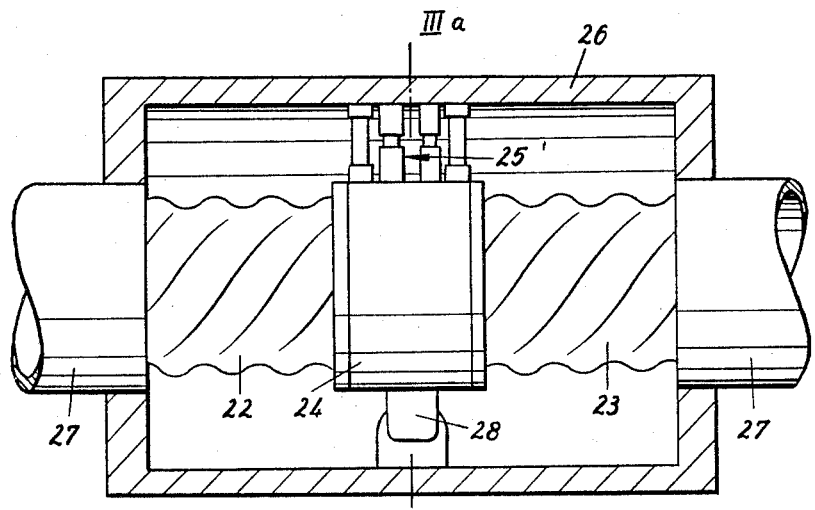
FIGURE 3 shows a longitudinal section of a flow meter according to another modification of the invention with a pneumatic measuring device and with a pivotable suspension of the movable pipe section.
Figure 3A:
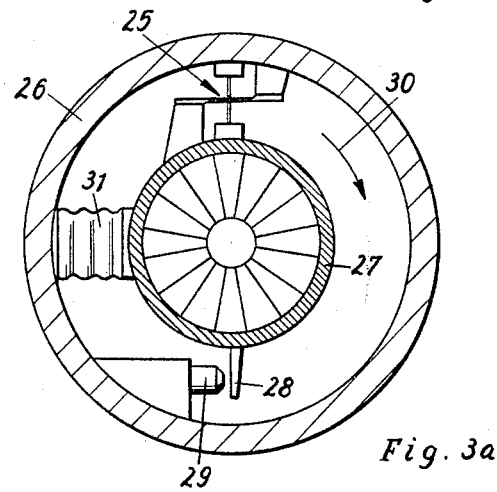
FIGURE 3a shows a cross section which is taken along the line IIIa—IIIa of FIGURE 3.

FIGURES 3 and 3a illustrate a further embodiment of the invention in which the movable pipe section consists of two tubular members 22 and 23 which may be resiliently twisted about their common axis, and of a guide wheel 24 which is mounted between these tubular members. The resilient tubular members form corrugated tubes which have a plurality of helical corrugations. Guide wheel 24 is pivotably suspended on the housing 26 by means of a resilient cross-band joint 25 in order to take up the weight of the apparatus and that of the flowing medium. At their outer ends, the resilient tubular members 22 and 23 are secured to the main pipe line 27. The outer jacket of guide wheel 24 carries rigidly thereon a reflecting plate 28 which is located opposite to an air nozzle 29. Under the reaction of the torque upon the corrugated tubes 22 and 23 and the guide wheel 24, the latter is given a reverse twist about the crossband joint 25 in the direction of the arrow 30, as shown in FIGURE 3a, whereby the distance between the reflecting plate 28 and the air nozzle 29 is changed in proportion to the rate of flow of the medium passing through tubes 22 and 23 and guide wheel 24. The varying pressure head in the line leading to the air nozzle 29 is measured in a conventional manner and passed to an amplifier the output pressure of which is passed to and acts upon the compensating bellows 31 so that the guide wheel 24 only needs to carry out very small rotary movements. The pneumatic measuring device as illustrated in FIGURES 3 and 3a may, of course, be replaced by a magnetic measuring device similar to that as shown in FIGURE 1 or by any other distance measuring device of a conventional type. If, for example, a magnetic measuring device is employed, an opening may be provided in the walls of the movable parts 22 to 24 through which the medium may flow into the housing 26 so as to balance the static pressure of the medium in the resilient tubes 22 and 23 and thereby protect them from breaking or bursting under this pressure.

Figure 4:
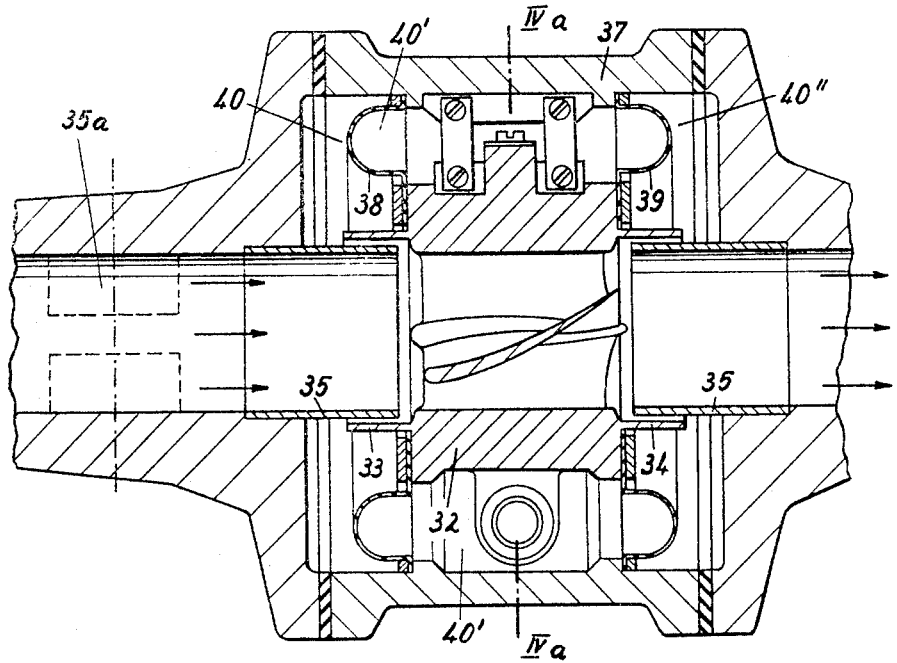
FIGURE 4 shows a flow meter according to a further modification of the invention with means for compensating the static pressure of the medium.
Figure 4A:
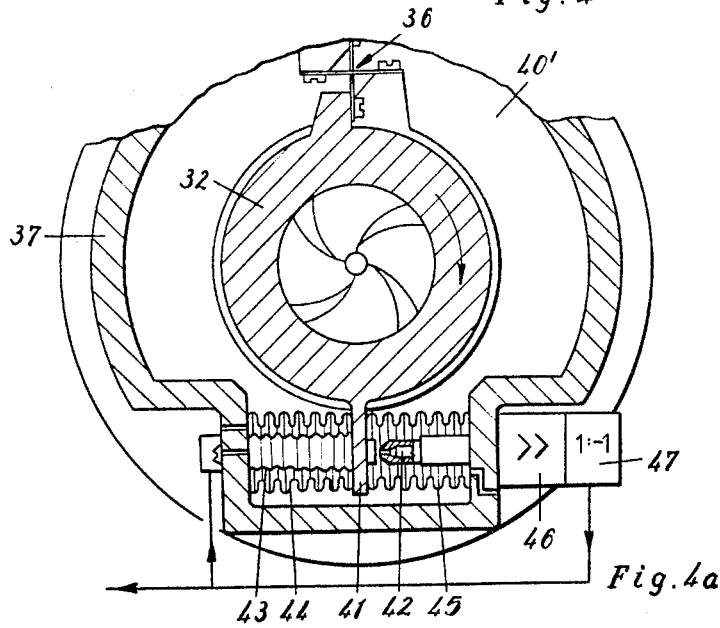

FIGURES 4 and 4a illustrate a measuring apparatus in which the influence of the static pressure is eliminated. The movable pipe section consists in this case essentially of a guide wheel unit 32 the tubular ends 33 and 34 of which overlap the tubular connecting parts 35 of the main pipe line and have a slightly larger diameter than the latter so that an annular gap is formed between them. Guide wheel unit 32 is pivotably mounted on the housing 37 by means of a resilient cross-band joint 36. The inside of housing 37 is divided by two elastic partitions 38 and 39 into three chambers 40, 40′, and 40″. The two outer chambers 40 and 40″ are filled with the fluid medium to be measured, while the central chamber 40′ is filled with a suitable neutral liquid. As shown in FIGURE 4a, the outer wall of the guide wheel unit 32 carries a reflecting plate 41 which is operatively associated with the air nozzle 42 and also engages with one end of the compensating bellows 43. Air nozzle 42 and the compensating bellows 43 are separated from the liquid in chamber 40′ by additional protective bellows 44 and 45 which have equal dimensions and equal resilience. The pressure head on the air nozzle 42 controls the amplifier 46 the output pressure of which is conducted in a conventional manner through a pneumatic inverting relay 47 to the compensating bellows 43. The purpose of the pneumatic inverting relay 47 is merely to invert the effective pressure coming from the amplifier 46.

The mode of operation of the flow meter according to FIGURES 4 and 4a is again based upon the fact that the flowing medium to be measured exerts a torque upon the guide wheel unit 32 which is essentially determined by the velocity and density of this medium and by the particular shape of the blades of the guide wheel. This torque is compensated by the effect of the pneumatic compensating device which depends upon the distance between the fixed pivot point 36 of the guide wheel unit 32 on the housing 37 and the central axis of the compensating bellows 43.

The static pressure of the flowing medium occurring in the pipe line in front of and behind the guide wheel unit 32 acts upon the elastic partitions 38 and 39 and produce a corresponding pressure in the central liquid-filled chamber 40′. This pressure, in turn, acts upon the resilient bellows 44 and 45 between housing 37 and the reflecting plate 41 which is rigidly secured to or integral with the guide wheel unit 32. The effective surfaces of bellows 44 and 45 are of equal dimensions and their central axes are equally spaced from the pivot point 36. Their torque effects upon the guide wheel unit 32 are therefore equal but directed inversely to each other. Consequently, the static pressure will not cause any additional torque upon the entire apparatus. If the static pressure has a small value, the additional compensating bellows 43 may be omitted since the resilient bellows 44 at the side opposite to the air nozzle will then suffice as a compensating bellows. If the effective surfaces of bellows 44 and 45 differ in size only slightly from each other, this difference may be compensated by adjusting the distances of these surfaces from the pivot point 36 so as also to differ slightly from each other.

In order to permit the measuring method according to the invention to be employed also for measuring small velocities and rates of flow, it is advisable to give the flowing medium a suitable preliminary twist before it enters the guide wheel 32 or, if it already has a twisting motion, at least to eliminate this uncontrolled twist. By such a controlled preliminary twist it is possible to increase the torque which acts upon the guide wheel 32. This may be accomplished by providing additional guide surfaces 35a within the tubular connecting part 35, as indicated in FIGURE 4 in dotted lines. Such additional guide surfaces 35a may also be provided so as to be rotatable about a substantially radial axis.

The flow meter according to FIGURES 4 and 4a has the further advantage that due to the fact that the liquid contained in the annular gaps between the tubular parts 33 and 35 or 34 and 35 has to be displaced at any pivoting movement of the guide wheel unit 32, any possible vibrations of the guide wheel unit 32 will be suppressed.

If the flowing medium to be measured is chemically neutral and noncorrosive, it is only necessary to provide the apparatus with a single elastic partition between the guide wheel 32 and the housing 37 so that the liquid-filled pressure chamber may be omitted. The fluid medium flowing through guide wheel 32 then fills out the space at both sides of the elastic partition, for example, the partition 38, which then prevents the medium from flowing in a secondary circuit around the outside of guide wheel 32. In the event that the measuring accuracy of the apparatus does not have to be very high, both elastic partitions may be omitted. A small secondary current will then occur the volume of which will be determined substantially by the difference between the fluid pressures in front of and behind the guide wheel 32 and the resistance to the flow of this secondary current. This resistance is determined by the cross-sectional area of the annular gaps between the tubular parts 33, 35 and 34, 35 and the length of the overlap of these tubular parts.

The flow meter according to FIGURES 4 and 4a is only adapted to measure the rate of flow within a specific measuring range. In order to permit the measuring range to be adjustable, the invention may be further modified in the manner as illustrated in FIGURE 5. In this apparatus, there are two guide wheel units 53 and 54 which are designed and suspended in a manner similar to the guide wheel unit as shown in FIGURE 4 and are arranged behind each other within the housing 52 between the two connecting flanges 50 and 51 of the main pipe line. Each of these guide wheel units 53 and 54 is pivotably mounted on a cross-band joint 55 (only the right joint 55 being shown). The flowing medium passes through the overlapping tubular parts 56 to 61. The outer walls of the guide wheel units 53 and 54 are connected to the housing 52 by four resilient bellows 62 to 65. Bellows 62 and 63 serve for transmitting the movements of the guide wheels which are to be measured to the outside of housing 52 without any leakage of liquid from the inside of the latter. The connecting rods 66 and 67 which pass through these bellows connect the guide wheel units 53 and 54 to a compensating lever 68.

The two guide wheel units 53 and 54 are mounted with respect to the main pipe line so as to exert the same flow-twisting effect but in opposite directions to each other so that the twist of the flow which is produced by the first guide wheel unit 53 is again neutralized by the second guide wheel unit 54. This has the advantage that, if the fluid enters the apparatus without any twisting motion, it will also leave it without any twisting motion after being measured or if it enters with a twisting motion, it will also leave it with the same motion. A further advantage of this apparatus is the fact that it permits the torque effects which are produced by the two guide wheel units to be either added to or subtracted from each other. These two possibilities will become evident from the following description.

In the apparatus according to FIGURE 5 it is assumed that, as seen in the direction of flow, the fluid medium exerts a right-hand torque upon the guide wheel unit 53 and a left-hand torque upon the guide wheel unit 54. Each guide wheel unit 53 and 54 is pivotably suspended on the housing 52 by a cross-band joint 55, only one of which is shown. In both embodiments, as will be subsequently described, the pivot axes of these two joints 55 are located within a plane which extends vertically to the sectional plane passing through the central axes of the guide wheel units. In one of these embodiments, however, the two guide wheel units 53 and 54 are pivotably mounted on the cross-band joints 55 at the opposite sides of housing 52, that is, underneath and above the sectional plane according to FIGURE 5, while in the other embodiment the two guide wheel units 53 are pivotably mounted on the same side of housing 52, for example, underneath this sectional plane. In both embodiments, the distances between the pivot points and the longitudinal axis of the guide wheel units 53 and 54 are equal.

Let us first assume that the guide wheel unit 53 is pivotable about an axis which is located underneath the sectional plane according to FIGURE 5, that is about the axis of a cross-band joint, not shown, which is mounted on the housing 52 at the opposite side of the joint 55 of the guide wheel unit 54. A pressure is then transmitted from the guide wheel unit 53 through the connecting rod 66 to the compensating lever 68 in the direction as indicated by the arrow next to the connecting rod 66. If the cross-band joint 55 of the guide wheel unit 54 is located above the sectional plane according to FIGURE 5, and as shown therein, there is likewise a pressure transmitted from this guide wheel unit through the connecting rod 67 to the compensating lever 68. If, however, the pivot axis of the guide wheel unit 54 is located at the same side of the housing as the pivot axis of the guide wheel unit 53, that is, likewise underneath the sectional plane according to FIGURE 5, a traction will be exerted from the unit 54 through the connecting rod 67 upon the compensating lever 68.

Assuming that the torques which are produced by the two guide wheel units 53 and 54 are equal and that the pivot bearing 68a of compensating lever 68 is located at the center between the connecting rods 66 and 67, either the difference between or the sum of the torques will act upon the compensating lever 68, depending upon whether the pivot axes of the two guide wheel units are located at opposite sides or at the same side of housing 52. If the difference of the torques acts upon the compensating lever 68, this normally means that this lever is already in a state of balance under the action of the pressures which are exerted thereon by both connecting rods 66 and 67 and that no additional compensating force will be required. This condition is therefore of no practical interest.

If, however, the pivot bearing 68a of compensating lever 68 is designed so as to permit it to be shifted in one direction or the other between the connecting rods 66 and 67, the compensating lever 68 will receive a torque which is proportional to the difference between the torques which are produced by the guide wheel units 53 and 54. This torque may be adjusted to a very small value so that the compensating device will also need to exert only a small torque upon the compensating lever in order to attain the required state of balance of moments on the lever 68. Such an arrangement is suitable when employing one of the conventional electric compensation devices since they are only capable of producing relatively small compensating forces.

The method according to the invention may, however, also be modified insofar as the torques which are produced by the guide wheel units may also be of different strengths. This may be easily attained by making the guide wheel units of different dimensions or by making the angularity of the blades of one guide wheel unit different from the angularity of the blades of the other. In such a case, a torque will act upon the compensating lever 68 which is proportional to the difference between the torques of the guide wheel units 53 and 54 when the connecting rods 66 and 67 are equally spaced from the pivot axis 68a. In the event that the fluid medium enters the apparatus with a preliminary twist, the torques which are produced by the guide wheel units 53 and 54 will, of course, thereby be changed. However, these changes will be of the same value in both guide wheel units, but will act inversely to each other. Thus, for example, if the torque which is produced by the guide wheel unit 53 increases by a value corresponding to the preliminary twist of the entering fluid, the torque which is produced by the guide wheel unit 54 will decrease accordingly. Therefore, when the difference between the torque effects of the two guide wheel units is measured, the changes in the torques which are caused by the preliminary twist of the flowing medium compensate each other and do not affect the result of the measurement.

In the event that, by pivotably mounting both guide wheel units 53 and 54 about a common axis on the same side of housing 52, the sum of the torques acts upon the compensating lever 68, a considerable force is required for compensating this sum so that a compensating device has to be employed which is actuated by a special pressure medium as illustrated in FIGURE 5 by the elements 69, 70, 71, and 72.

Since the reflecting plate 69 which controls the amplifier 70 is rigidly secured to the compensating lever 68, it also carries out the relatively small movements of the latter. The output pressure $p_a$ of amplifier 70 acts by means of the bellows 71 upon the pivotably mounted lever 72. The compensating force is then transmitted from lever 72 to the compensating lever 68 by means of the roller 73 which may be adjusted to different positions by being shifted in the direction of the double arrow 74. This adjustment can be accomplished for example by providing the cylinder 73 with a bore extending within its longitudinal axis, this bore being engaged by a bolt which is movable by means of a threaded mechanism. This threaded mechanism can be mounted within a bore at the right side of the housing and can be controlled from the outside by a regulating screw.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A method of measuring the rate of flow of a fluid medium flowing through a pipe line comprising the steps of subjecting the flowing medium within one part of the pipe line to a certain helical twisting motion in its direction of flow, whereby a torque is exerted by the medium upon said part of the pipe line, then subjecting the flowing medium in a subsequent part of the pipe line to a twisting motion directed inversely to said first twisting motion, whereby a further torque inverse to said first torque is exerted by the medium upon said subsequent part of the pipe line, and measuring on the outside of said pipe line at least one physical value which is produced by the difference between said torques.

2. A flow meter comprising a pipe section adapted to be inserted between two adjacent parts of a pipe line, means for connecting said pipe section to said adjacent parts so as to be rotatable relative thereto about a common axis, means for producing in said pipe section a helical twisting motion of a fluid medium flowing through said pipe line and said pipe section, and means outside of said pipe line and pipe section for measuring the torque exerted by said twisting motion upon said pipe section, a housing connected to said adjacent parts of said pipe line and enclosing said pipe section, said twist producing means comprising at least one guide wheel similar to a turbine wheel within said housing and connected to said pipe section, and pivot means connecting said guide wheel and said housing for pivotably suspending said guide wheel in said housing.

3. A flow meter as defined in claim 2, in which said measuring means comprise a pneumatic system including a jet nozzle and a reflecting plate associated with and spaced at a small distance from said nozzle and rigidly secured to said pipe section.

4. A flow meter as defined in claim 2, in which said pivot means are connected to said guide wheel at one side thereof, and further comprising a pneumatic bellows connected to and supporting the opposite side of said guide wheel, and means for producing a pressure in said bellows in proportion to said torque acting upon said pipe section so as to compensate said torque.

5. A flow meter as defined in claim 4, in which said pressure producing means comprise a pneumatic system including a jet nozzle and a reflecting plate associated with and spaced at a small distance from said nozzle and rigidly secured to said pipe section, and protective bellows within said housing and enclosing said nozzle, said reflecting plate, and said pneumatic bellows.

6. A flow meter as defined in claim 5, further comprising two elastic partitions between said pipe section and said housing and dividing the inside of said housing into two outer chambers and an inner chamber, means to permit said outer chambers to communicate with and to be filled by said fluid medium, a neutral fluid filling said inner chamber, said protective bellows containing said nozzle, said reflecting plate, and said pneumatic bellows being mounted within said inner chamber.

7. A flow meter as defined in claim 6, in which said communicating means comprise tubular members on said pipe section and on said adjacent parts of said pipe line and telescopically overlapping each other so as to form intermediate annular gaps for the passage of said fluid medium from said pipe line into said outer chambers and for suppressing undesirable vibrations of said pipe section.

8. A flow meter as defined in claim 2, in which said pivot means comprise a resilient cross-band joint.

9. A flow meter comprising a pipe section adapted to be inserted between two adjacent parts of a pipe line, means for connecting said pipe section to said adjacent parts so as to be rotatable relative thereto about a common axis, means for producing in said pipe section a helical twisting motion of a fluid medium flowing through said pipe line and said pipe secton, and means outside of said pipe line and pipe secton for measuring the torque exerted by said twisting motion upon said pipe section, a housing connected to said adjacent parts of said pipe line and enclosing said pipe sections, said twist producing means comprising two guide wheels similar to a turbine wheel within said housing and connected to said pipe section, and pivot means connecting said guide wheels and said housing for pivotably suspending said guide wheels in said housing, said guide wheels being pivotably suspended by said pivot means on and within said housing behind each other, and further comprising a lever pivotably mounted on said housing, means for connecting said guide wheels to said lever at the opposite sides of the pivot point thereof, each of said guide wheels being adapted to producing a twisting motion of said fluid medium in a direction inverse to the twisting motion produced by the other guide wheel, said measuring means being adapted to measure the torques produced by said guide wheels and being proportional to the different twisting motions produced by said guide wheels.

10. A flow meter as defined in claim 9, in which said pivot means on which said guide wheels are suspended are located at the same side of said housing, so that a force may be measured and compensated which are proportional to the sum of the torques produced by said guide wheels.

11. A flow meter as defined in claim 9, in which said pivot means on which said guide wheels are suspended are located at opposite sides of said housing, so that a force may be measured and compensated which is proportional to the difference between the torques produced by said guide wheels.

References Cited by the Examiner
UNITED STATES PATENTS

| | | | |
|---|---|---|---|
| 2,742,784 | 4/1956 | Brous | 73—228 |
| 2,800,794 | 7/1957 | Meneghelli | 73—228 |
| 2,811,855 | 11/1957 | Kotas | 73—228 |
| 2,975,635 | 3/1961 | Kiner et al. | 73—228 X |
| 3,063,295 | 11/1962 | Dowdell | 73—194 |

RICHARD C. QUEISSER, *Primary Examiner.*

E. D. GILHOOLY, *Assistant Examiner.*